(No Model.)
H. L. FERRIS & E. B. HUNT.
CRANK SHAFT FOR BICYCLES.
No. 599,652.   Patented Feb. 22, 1898.
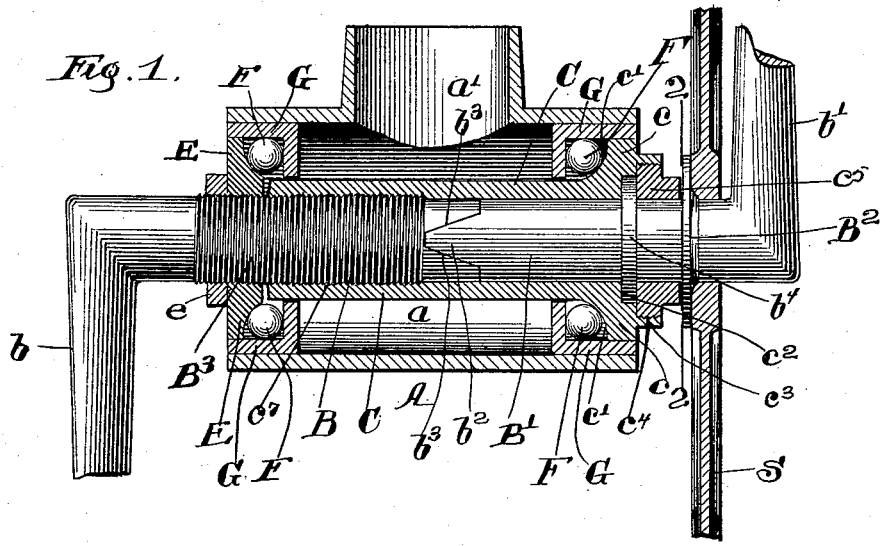
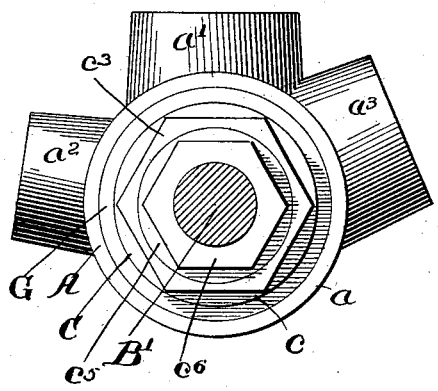
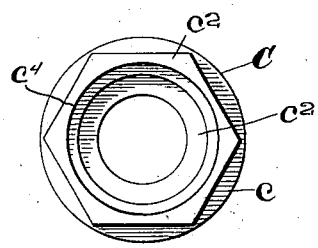
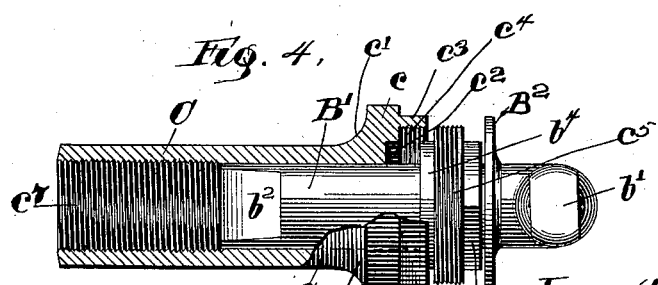
Witnesses:
Chas O. Shewey
M. L. Sheahan
Inventors:
Henry L. Ferris and
Elzo B. Hunt
by Miles Werner Bitner
their attys.

UNITED STATES PATENT OFFICE.

HENRY L. FERRIS AND ELZO B. HUNT, OF HARVARD, ILLINOIS.

CRANK-SHAFT FOR BICYCLES.

SPECIFICATION forming part of Letters Patent No. 599,652, dated February 22, 1898.

Application filed September 18, 1896. Serial No. 606,209. (No model.)

*To all whom it may concern:*

Be it known that we, HENRY L. FERRIS and ELZO B. HUNT, citizens of the United States of America, residing at Harvard, in the county of McHenry and State of Illinois, have invented certain new and useful Improvements in Crank-Shafts for Bicycles, of which the following is a specification.

Our invention relates to certain improvements in crank-shafts for bicycles; and to such end it consists in certain novel features of construction, which will be fully described in this specification and particularly pointed out in the claims.

The invention is clearly illustrated in the drawings presented herewith, in which—

Figure 1 is a central longitudinal section through the crank-shaft hanger and showing the crank-shaft and cranks in side elevation. Fig. 2 is a transverse section through the line 2 2, Fig. 1. Fig. 3 is an end elevation of a sleeve which forms part of our invention; and Fig. 4 is a view, partly in side elevation and partly in section, of one-half of the crank-shaft and the sleeve.

Referring to the drawings, the crank-shaft hanger is seen at A and is preferably formed of a cylindrical portion $a$, adapted to receive the shaft and bearings, and the bosses $a'$ $a^2$, adapted to receive the vertical and rearwardly-extending members, respectively, of the framework of a bicycle.

The crank-shaft is composed of two parts, as seen at B B', each part being formed with a crank $b$ $b'$ and having an engaging portion at its meeting end for locking the two together and thereby preventing their independent rotation. As seen in Fig. 1, the shaft B' is provided with a tongue $b^2$, extending into a corresponding notch or groove $b^3$ in the end of the shaft B, and it is evident that when this tongue is seated in the groove the two portions of the shaft are rigidly connected with respect to any rotating motion thereof. A sleeve C encircles a portion of the shaft and is provided with an annular flange $c$, which is formed with a bearing-surface $c'$, upon which the antifriction-balls are intended to roll. In the outer face of the annular flange $c$ is formed an annular groove $c^2$, in which is seated a flange or collar $b^4$ upon the portion B' of the crank-shaft, this flange or collar being adapted to prevent any longitudinal motion of the sleeve in one direction with respect to the shaft. The flange $c$ of the sleeve C is also formed with a portion $c^3$, adapted for engagement with a wrench and internally screw-threaded, as seen at $c^4$. A cap $c^5$ encircles the shaft immediately beyond the collar $b^4$ and is externally screw-threaded and adapted to be screwed into the internally-screw-threaded portion $c^3$, as seen in Figs. 2 and 4. This cap is formed with a portion $c^6$, adapted for engagement with a wrench, and when inserted in its proper place retains the collar in the groove $c^2$ and prevents the shaft from being moved from its position in the sleeve. A flange $B^2$ is formed upon the crank-shaft, and upon this flange is secured the ordinary sprocket-wheel S, such as is used in connection with bicycle crank-shafts.

Upon the other part of the crank-shaft is formed a screw-thread $B^3$, a portion of the sleeve C being internally screw-threaded, as seen at $c^7$, and the portion B of the crank-shaft being intended to be screwed into said sleeve. A bearing-cone E is screwed upon the portion B of the shaft and is provided with the ordinary bearing-face, upon which the opposite set of antifriction-balls run. This bearing-cone is also adapted to take up any play occasioned by the wear upon the bearing-surfaces, and a lock-nut $e$ is provided upon the shaft to prevent any accidental rotation of the cone upon the crank-shaft after it has once been set into proper place.

The balls are seen at F and, as has been heretofore described, bear upon the bearing-surfaces of the cone E and flange $c$ of the sleeve C, bearing-cups G being provided within the hanger A and forming the other portion of the bearings.

The crank-shaft is put in place as follows: The cups G G are first secured in the hanger in their proper positions and the required number of balls placed in the cup on the right-hand side of the hanger. The portion B' of the shaft is then inserted into the sleeve C and the cap $c^5$ screwed into the portion $c^4$ until the collar $b^4$ is securely held between the sleeve and the cap. This connection between the sleeve and portion B' of the crank-shaft evidently prevents any longitudinal motion of one with respect to the other. The sleeve C, together with the portion B' of the crank-shaft, is now inserted in the hanger and the required number of balls placed in the cup on the left-hand side thereof. The cone E and lock-nut e are then screwed upon the portion B of the crank-shaft and the latter screwed into the sleeve C until the end of said portion of the shaft comes in contact with the tongue $b^2$ upon the other portion of the shaft, when the latter will be rotated until the portion B has been tightly screwed into the sleeve. The cone E may now be adjusted to the proper position, the lock-nut screwed to place, and the shaft is ready for operation.

From the above it will be clearly seen that the two portions of the shaft are rigidly connected together, so that neither half can be rotated without rotating the other at the same time, and any longitudinal motion of either part with respect to the other is evidently prevented by the screw-threaded connection between the portion B and sleeve in one part and the collar $b^4$ and sleeve on the other.

We claim as new and desire to secure by Letters Patent—

1. The combination with a suitable hanger, of a double-crank shaft journaled in said hanger, said crank-shaft having cranks upon opposite sides thereof and being composed of two interlocking portions incapable of relative rotation when brought together, one of two said portions being provided with an external screw-thread and the other with means of engagement against longitudinal movement, a sleeve adapted to embrace the shaft upon both sides of the interlocking portions and to turn thereon, said sleeve having an internal screw-thread at one end adapted to engage the said external screw-thread and having a portion at the other end adapted to engage a wrench to prevent rotation of the sleeve, and a cap adapted to be secured to the sleeve and to engage with the aforesaid means of engagement upon the shaft to prevent longitudinal movement thereof.

2. The combination with a crank-shaft composed of two parts provided with an interlocking device adapted to prevent relative rotation of either part, one of said parts being provided with a screw-threaded portion $B^3$, of a sleeve encircling said crank-shaft and having an internally-screw-threaded portion engaging with the screw-threaded portion $B^3$, one end of said sleeve being formed into a flange having a bearing-surface adapted to roll upon suitable antifriction-balls, and a suitable locking device adapted to lock said sleeve to the part of the shaft which has no screw-thread against longitudinal motion but not against rotation.

3. The combination with a crank-shaft formed with two parts having interlocking portions adapted to prevent relative rotation of either part, and one of said parts being provided with a screw-threaded portion, of a bearing-cone E, secured upon said screw-threaded portion, a sleeve encircling said shaft and having a screw-threaded portion engaging with the screw-thread upon the shaft, one end of said sleeve being formed into a bearing-cone corresponding with the bearing-cone upon the screw-threaded part of the shaft, and a suitable device for preventing longitudinal motion of the sleeve with reference to the part of the shaft which has no screw-thread while permitting rotation of the sleeve upon the shaft; substantially as described.

4. The combination with a crank-shaft hanger containing a pair of ball-cups provided with balls, of a sleeve bearing one of the ball-cones said sleeve extending from said cone inwardly within the hanger and being provided at its inner end with an internal screw-thread and extending outwardly from said cone and being provided upon its outer end with means adapted to engage a wrench, a crank-shaft within said sleeve composed of two parts provided with means of engagement against relative rotation, the part within the end of the sleeve which bears the ball-cone being provided with means of engagement with said sleeve adapted to permit rotation therein but to prevent longitudinal movement with respect thereto, and the other portion of said shaft being provided with an external screw-thread fitted to the internal thread within the sleeve and extending beyond the same, and a second ball-cone threaded upon the portion of said external screw-thread which extends beyond the inner end of the sleeve; substantially as described.

HENRY L. FERRIS.
ELZO B. HUNT.

Witnesses:
BLAKE B. BELL,
CHARLES E. HUNT.